(12) United States Patent
Masui et al.

(10) Patent No.: US 7,251,141 B2
(45) Date of Patent: Jul. 31, 2007

(54) RACK AND BLOCK FOR HOUSING DOSIMETERS

(75) Inventors: Kaoru Masui, Tokyo (JP); Hironobu Kobayashi, Tokyo (JP)

(73) Assignee: Fuji Electric Systems Co., Ltd., Tokyo (JP)

( * ) Notice: Subject to any disclaimer, the term of this patent is extended or adjusted under 35 U.S.C. 154(b) by 339 days.

(21) Appl. No.: 10/920,289

(22) Filed: Aug. 18, 2004

(65) Prior Publication Data

US 2005/0201066 A1    Sep. 15, 2005

(30) Foreign Application Priority Data

Feb. 26, 2004    (JP) .............................. 2004-051880

(51) Int. Cl.
    *H05K 7/18*    (2006.01)
(52) U.S. Cl. ................. 361/727; 312/223.1; 312/223.2
(58) Field of Classification Search .. 312/223.1–223.2, 312/727; 361/727
    See application file for complete search history.

(56) References Cited

U.S. PATENT DOCUMENTS

| 3,581,030 A | * | 5/1971 | Sedley | ........................ 200/46 |
| 4,609,829 A | * | 9/1986 | Milby et al. | ................. 307/150 |
| 5,124,886 A | * | 6/1992 | Golobay | ...................... 361/727 |
| 5,813,791 A | * | 9/1998 | Kubota | ........................ 403/294 |
| 6,618,254 B2 | * | 9/2003 | Ives | ........................... 361/726 |

FOREIGN PATENT DOCUMENTS

| JP | 10-332830 | 12/1998 |
| JP | 2003-167055 | 6/2003 |

* cited by examiner

*Primary Examiner*—Lisa Lea-Edmonds
*Assistant Examiner*—Ingrid Wright
(74) *Attorney, Agent, or Firm*—Manabu Kanesaka

(57) ABSTRACT

A rack for housing dosimeters includes a plurality of blocks having a rectangular shape. Each block is provided with a housing space for housing the dosimeter and an entrance opened in a front surface of the block for inserting the dosimeter therethrough. Each block also has at least one of a projection and a concavity formed on at least one of top, bottom, left, and right surfaces to be fitted to each other. Accordingly, it is possible to assemble the plurality of the blocks in at least one of vertical and horizontal directions by fitting the projection and the concavity on the blocks.

16 Claims, 10 Drawing Sheets

RACK AND BLOCK FOR HOUSING DOSIMETERS

BACKGROUND OF THE INVENTION AND RELATED ART STATEMENT

The present invention relates to a rack and a block for housing and storing dosimeters. The dosimeter is a portable device carried by a worker entering into a restricted radiation area in a nuclear power plant and the like.

Figure 10:
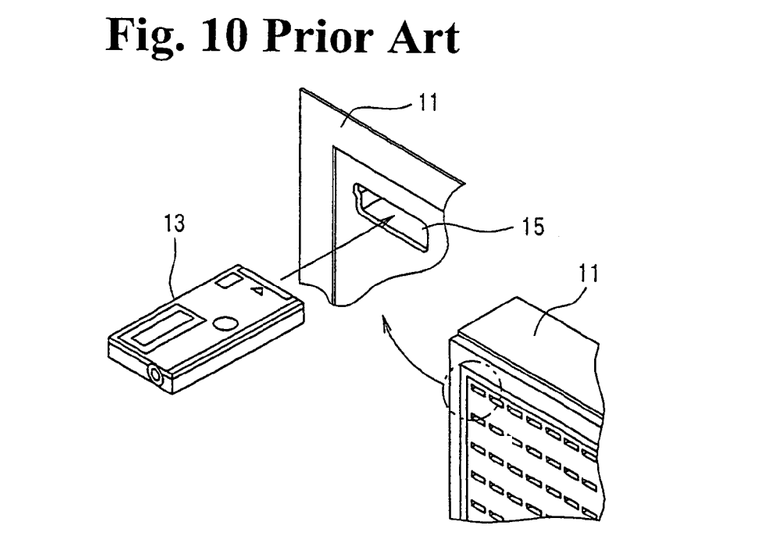
FIG. 10 shows a structure of a conventional rack for housing dosimeters.
Figure 11:
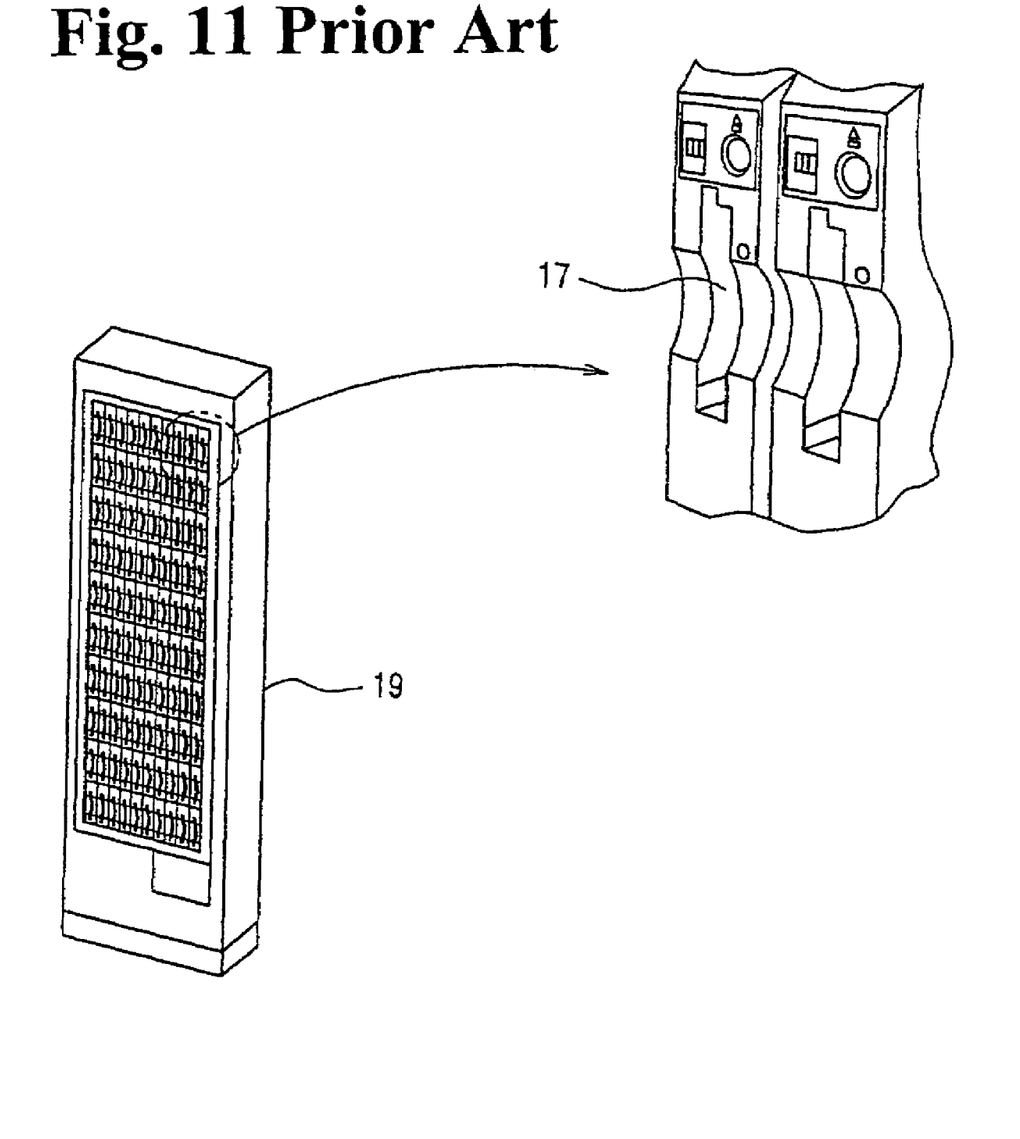
FIG. 11 shows a structure of another conventional rack for housing dosimeters.

A rack for housing dosimeters is disclosed in Japanese Patent Publication (Kokai) No. 2003-167055. As shown in FIG. 10, a rack 11 has a rectangular shape, and a large number of entries 15 are arranged in horizontal and vertical directions for inserting the dosimeters. A dosimeter 13 is inserted through the entry and housed in a housing space. Japanese Patent Publication (Kokai) No. 10-332830 has disclosed a rack 19 as shown in FIG. 11, in which a large number of entries 17 are arranged for receiving the dosimeters (not shown).

The conventional racks for housing the dosimeters as disclosed in Japanese Patent Publications (Kokai) No. 2003-167055 and No. 10-332830 have a problem as follows. The number of the dosimeters to be housed in the rack may vary, for example, from 10 to 200 corresponding to the number of the dosimeters for service. Accordingly, the rack needs to have various shapes, for example, horizontally or vertically prolonged shapes, corresponding to a location of installation. As a result, it is necessary to design and manufacture a new rack every time to store the desired number of the dosimeters and the installation location, thereby increasing cost for design and manufacture.

In view of the problem described above, the present invention has been made, and an object of the invention is to provide a block and a rack for housing dosimeters that is suited to the number of dosimeters for service and an installation location of the rack, and that can be manufactured at low cost.

Further objects and advantages of the present invention will be apparent from the following description of the invention.

SUMMARY OF THE INVENTION

To attain the objects described above, according to a first aspect of the present invention, a rack for housing dosimeters carried by workers entering into a radiation controlled area comprises a plurality of blocks having a rectangular shape. Each of the blocks is provided with a housing space for housing the dosimeter and an entry opened in a front surface of the block for inserting the dosimeter therethrough. Each of the blocks also has at least one of a projection and a concavity formed on at least one of top, bottom, left, and right surfaces to be fitted to each other. Accordingly, it is possible to combine the plurality of the blocks in at least one of vertical and horizontal directions by fitting the projection and the concavity formed on the blocks.

With this structure, it is possible to form the rack for housing dosimeters simply by combining a desired number of the blocks for housing the dosimeters through fitting the projection and the concavity in vertical or horizontal direction. Therefore, the rack can be easily manufactured corresponding to the number of the dosimeters. According to the installation location, the rack can also be manufactured easily to have a vertically or horizontally elongated shape. The rack is manufactured simply by combining the blocks that are manufactured at low cost. Accordingly, the rack that is suited to the number of the dosimeters for service and the installation location can be manufactured at low cost.

According to a second aspect of the present invention, in the rack for housing the dosimeters of the first aspect, the block is provided with a magnet embedded in a wall thereof for switching a power supply of the dosimeter with magnetic flux of the magnet in case that the dosimeter contains the switch that turns the power supply on/off by sensing the magnetic flux. With this structure, it is possible to automatically turn off the power supply of the dosimeter when the dosimeter is inserted into the housing space of the block.

According to a third aspect of the present invention, in the rack for housing the dosimeters of the first aspect, the block is provided with switching means in the housing space thereof for mechanically switching a power supply of the dosimeter in case that the dosimeter contains the switch that mechanically turns the power supply on/off. With this structure, it is possible to automatically turn off the power supply of the dosimeter when the dosimeter is inserted into the housing space of the block.

According to a fourth aspect of the present invention, in the rack for housing the dosimeters of any one of the first to third aspects, the block comprises at least one pair of the projection and concavity formed on at least one of the top, bottom, left and right surfaces. The projection has a bar shape and the concavity has a shape fitting to the projection. The one pair of the projection and concavity is formed in parallel to a direction connecting between an edge of the entry and an edge of the rear surface. With this structure, at least one pair of the projection and the concavity fitting to the projection is formed on the external surface of the block in parallel to a direction connecting the edge of the entry and the edge of the rear surface. Accordingly, it is possible to manufacture the blocks with a pair of dies that can be disassembled in two directions toward a front surface side and a rear surface side, thereby reducing manufacturing cost of the dies. The dies can be disassembled in the two directions, thereby reducing steps of manufacturing the blocks.

According to a fifth aspect of the present invention, a rack for housing dosimeters comprises a plurality of blocks having a rectangular shape. Each of the blocks is provided with a housing space for housing the dosimeter and an entry opened in a front surface of the block for inserting the dosimeter therethrough. Each of the blocks also has at least one of a projection and a concavity formed on at least one of top, bottom, left, and right surfaces to be engaged to each other. Accordingly, it is possible to combine the plurality of the blocks in at least one of vertical and horizontal directions by engaging the projection and the concavity on the blocks.

With this structure, it is possible to form the rack for housing the dosimeters simply by combining a desired number of the blocks for housing the dosimeters through engaging the projection and the concavity in vertical or horizontal direction. Therefore, the rack can be easily manufactured with low cost corresponding to a number of the dosimeters and an installation location. The rack can also be manufactured easily to have a vertically or horizontally elongated shape. The rack is manufactured simply by combining the blocks that are manufactured at low cost. Accordingly, the rack that is suited to the number of the dosimeters for service and the installation location can be manufactured at low cost. The blocks engage with each other, and can be firmly combined.

According to a sixth aspect of the present invention, in the rack for housing the dosimeters of any one of the first to fifth aspects, the blocks have the same external dimension and the housing spaces with different dimensions. With this structure, the blocks have the same external dimensions in spite of different sizes of housing spaces. Accordingly, it is possible to combine the blocks without considering the sizes of the housing spaces. Therefore, the rack suited to the number of the dosimeters for service and the installation location can be manufactured at low cost.

According to a seventh aspect of the present invention, in the rack for housing the dosimeters of the sixth aspect, each type of the blocks has a specific color for identification. With this structure, it is easy to identify the housing spaces with the difference sizes by the specific color painted on the front surface of the blocks, thereby improving visibility of the dosimeter upon housing.

According to an eighth aspect of the present invention, the rack for housing the dosimeters in any one of the first to seventh aspects further comprises a cover member for covering outer peripheral surfaces of a combined structure of the plurality of the blocks. With this structure, the cover member covers the combined structure, so that the blocks are fastened integrally, thereby avoiding collapse. When the cover member is made of a hard material including a resin or metal, the combined blocks are protected from impact damage.

According to a ninth aspect of the present invention, in the rack for housing the dosimeters in the eighth aspect, the cover member comprises a set of two slide plates arranged in a longitudinal direction and a guide plate engaging the slide plates so that the slide plates slide in the longitudinal direction; a connection member for fixing corners of a frame in a state that members formed of the slide plates engaging the guide plates are arranged in the frame; and fixing means for fixing the slide plates and the guide plates not to move. With this structure, the cover member is adjusted and pressed on the peripheral side faces of the rectangular body formed by combining a required number of the blocks. The slide plates and the guide plates are fixed with the connection member to fasten the blocks integrally. Accordingly, even when the combined bodies of the blocks have different sizes, one type of cover member can fasten the combined bodies with the different sizes.

According to a tenth aspect of the present invention, the rack for housing the dosimeters of any one of the first to ninth aspects further comprises at least one joining plate for contacting rear surfaces of the combined blocks. The joining plate is put on the rear surfaces of the combined blocks and fixes all the blocks by screws or pins. With this structure, the rack can be manufactured easily and at low cost when a small number of the blocks are combined or the rack for housing the dosimeters is used temporarily.

According to an eleventh aspect of the present invention, a block has an external shape of rectangular solid. The block is provided with a housing space, so that a dosimeter is inserted and housed in the housing space through an entry opened in a front surface of the block when a person carrying the dosimeter enters a radioactive restricted area. The block comprises at least one of a projection and a concavity to be fitted to the projection on at least one of top, bottom, left, and right external surfaces of the block. With this structure, the rack for housing the dosimeters can be constructed only by combining a desired number of the blocks for housing the dosimeters vertically or horizontally. It is easy to produce a large number of the blocks having the structure described above at low cost. Therefore, when the rack for housing the dosimeters is manufactured, the rack that is suited to a desired number of the dosimeters and an installation location can be manufactured easily at low cost.

According to a twelfth aspect of the present invention, in the rack for housing the dosimeters of the eleventh aspect, the block is provided with a magnet embedded in a wall thereof for switching a power supply of the dosimeter with magnetic flux of the magnet in case that the dosimeter contains the switch that turns the power supply on/off by sensing the magnetic flux. With this structure, it is possible to automatically turn off the power supply of the dosimeter when the dosimeter is inserted into the housing space of the block.

According to a thirteenth aspect of the present invention, in the rack for housing the dosimeters of the eleventh aspect, the block is provided with switching means in the housing space thereof for mechanically switching a power supply of the dosimeter in case that the dosimeter contains the switch that mechanically turns the power supply on/off. With this structure, it is possible to automatically turn off the power supply of the dosimeter when the dosimeter is inserted into the housing space of the block.

According to a fourteenth aspect of the present invention, in the rack for housing the dosimeters of any one of the eleventh to thirteenth aspects, the block comprises at least one pair of projection and concavity formed on at least one of the top, bottom, left and right surfaces. The projection has a bar shape and the concavity has a shape fitting to the projection. The one pair of the projection and the concavity is formed in parallel to a direction connecting between an edge of the entry and an edge of a rear surface. With this structure, at least one pair of the projection and the concavity fitting to the projection is formed on the external surface of the block in parallel to a direction connecting the edge of the entry and the edge of the rear surface. Accordingly, it is possible to manufacture the blocks with a pair of dies that can be disassembled in two directions toward a front surface side and a rear surface side, thereby reducing manufacturing cost of the dies. The dies can be disassembled in the two directions, thereby reducing steps of manufacturing the blocks.

According to a fifteenth aspect of the present invention, a block has a rectangular shape. The block is provided with a housing space for housing a dosimeter and an entry opened in a front surface of the block for inserting the dosimeter therethrough. The block also has at least one of a projection and a concavity formed on at least one of top, bottom, left, and right surfaces to be engaged to each other. With this structure, it is possible to form a rack for housing the dosimeters simply by combining a desired number of the blocks for housing the dosimeters in vertical or horizontal direction. It is easy to produce a large number of the blocks having the structure described above at low cost. Therefore, when the rack for housing the dosimeters is manufactured, the rack that is suited to a desired number of the dosimeters and an installation location can be manufactured easily at low cost. The blocks engage with each other, and can be firmly combined.

As described above, according to the present invention, it is possible to manufacture the rack for housing the dosimeters that is suited to a number of the dosimeters and an installation location at low cost.

BRIEF DESCSRIPTION OF THE DRAWINGS

FIGS. 3(a) and 3(b) are views showing a block having switching means for turning off a power supply of a dosimeter inserted into a housing space thereof, wherein

FIGS. 4(a) and 4(b) are views showing a structure of a sliding frame cover of the rack for housing the dosimeters according to an embodiment of the invention, wherein

DETAILED DESCRIPTION OF PREFERRED EMBODIMENTS

Figure 1:
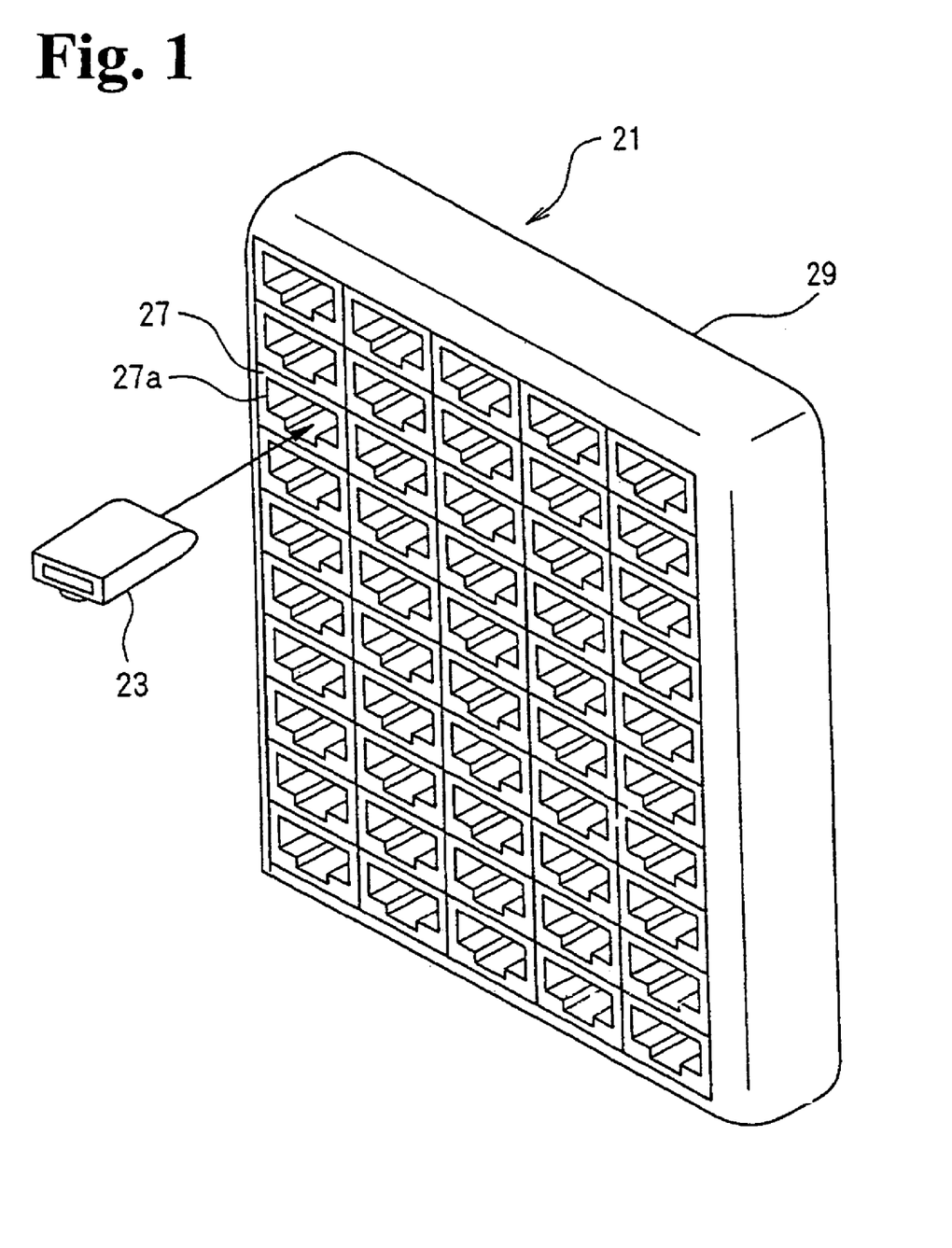
FIG. 1 is a perspective view showing a rack for housing dosimeters according to an embodiment of the invention.

Hereunder, embodiments of the present invention will be described with reference to the accompanying drawings. FIG. 1 is a view showing a structure of a rack for housing dosimeters according to an embodiment of the present invention. A rack 21 shown in FIG. 1 is formed of a specific number of blocks 27 arranged in horizontal and vertical directions to form a desired overall shape. A frame cover 29 covers top, bottom, left, and right surfaces of the overall structure to fix the blocks. The block 27 has a rectangular solid shape and houses a dosimeter 23 inserted through an entry 27a. The number of the blocks 27 in the embodiment is fifty corresponding to the number of dosimeters 23. Ten blocks are arranged in the vertical direction and five blocks are arranged in the horizontal direction according to an installation location of the rack. A shape of the block 27 includes any solid shapes exhibiting a rectangular projected shape such as an approximately rectangular solid shape, a cubic shape, and an approximately cubic shape.

Figure 2:
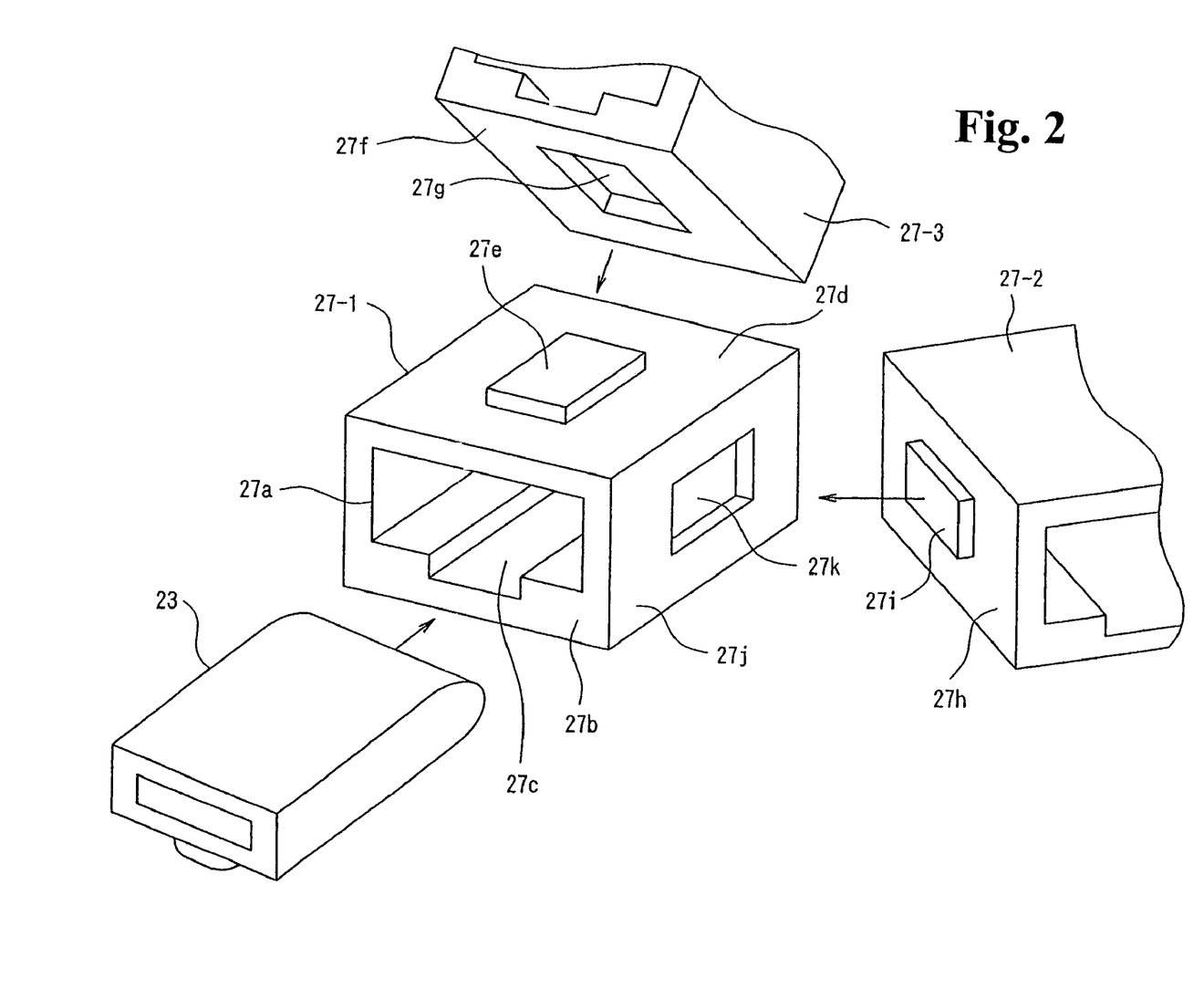
FIG. 2 shows a structure of blocks constituting the rack for housing the dosimeters according to the embodiment of the invention.

As shown in FIG. 2, a block 27-1 (27-2 and 27-3) has the entry 27a opened in a front surface 27b for inserting the dosimeter 23 and housing the same in a hollow housing space 27c. A projection 27e is formed at the center of a top surface 27d, and a concavity 27g is formed at the center of a bottom surface 27f. A projection 27i is formed at the center of a left surface 27h, and a concavity 27k is formed at the center of a right surface 27j. The projection 27e on the top surface 27d has a size fitting to the concavity 27g on the bottom surface 27f. The projection 27i on the left surface 27h has a size fitting to the concavity 27k on the right surface 27j. The projections 27e and 27i and the concavities 27g and 27k can be formed on any of the top, bottom, left, and right surfaces as far as the blocks 27 can be fitted to each other vertically and horizontally to form an integrated solid body.

The block 27 is molded with a thermoplastic resin. The resin includes polystyrene resin (PS), AS resin (AS), ABS resin (ABS), ACS resin (ACS), polycarbonate resin (PC), polyamide resin (PA), and acetal resin (POM). The frame cover 29 is made of a hard material including the resins described above and metal. The frame cover holds and prevents the blocks from collapsing, and also protects the blocks against impact damage. A flexible material such as rubber may be alternatively used for the frame cover 29.

Figure 3A:
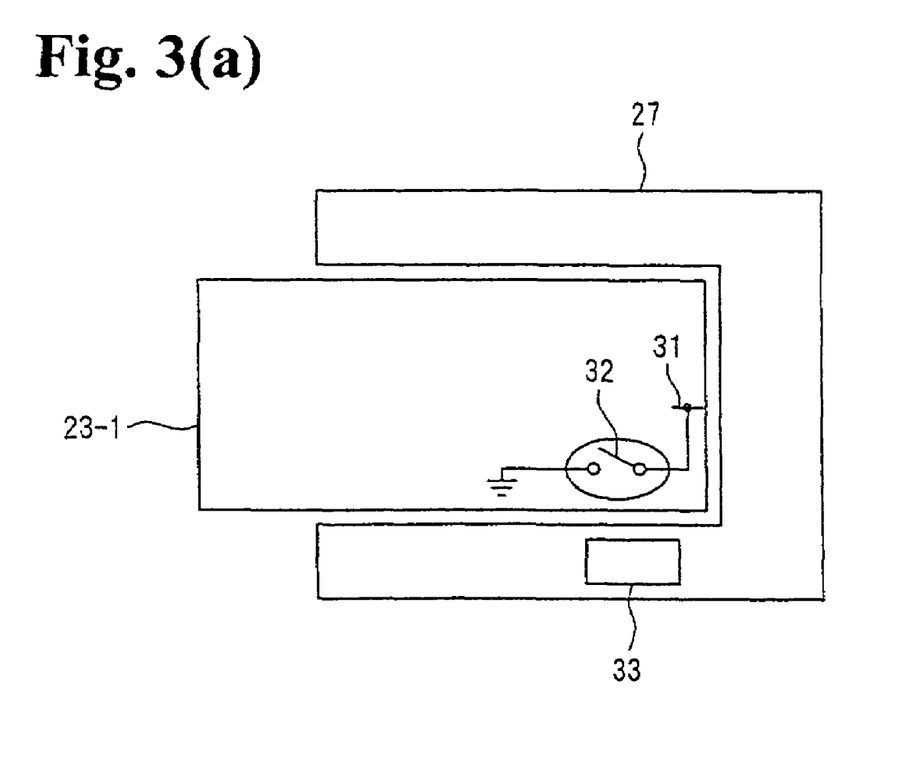
FIG. 3(a) is a view showing the block having a magnet as the switching means.
Figure 3B:
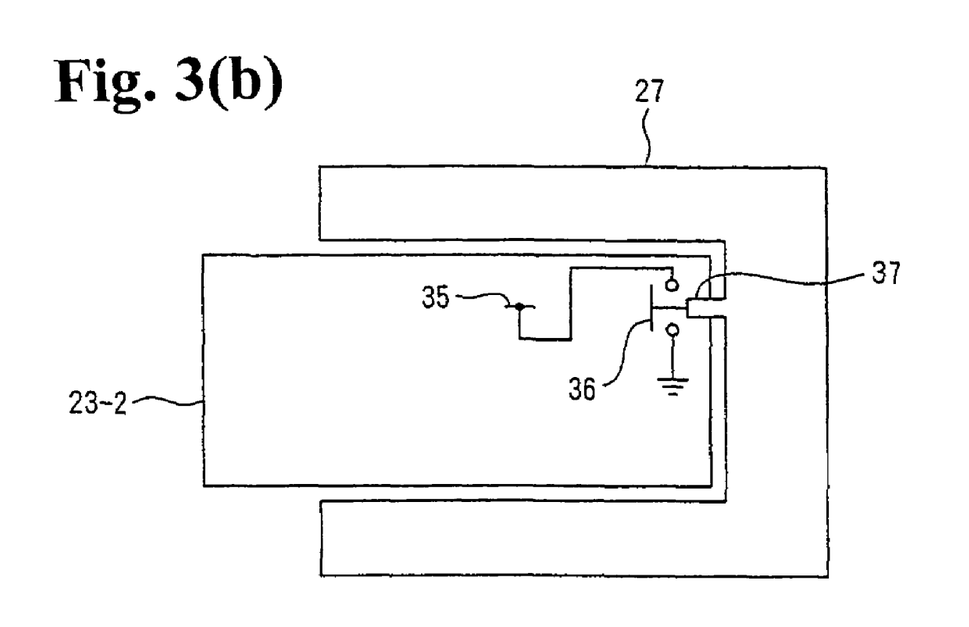
FIG. 3(b) is a view showing the block having a projecting bar as the switching means.

As shown in FIGS. 3(a) and 3(b), the block 27 may be provided with switching means for turning off power of the dosimeter inserted into the housing space 27c. A dosimeter 23-1 is provided with a reed switch 32 embedded in a side thereof for turning on and off a power supply 31 as shown in FIG. 3(a). In this case, the block may be provided with a magnet 33 embedded in a sidewall thereof for turning off the reed switch 32 by magnetic flux generated by the magnet. The magnet 33 may be embedded in one of top, bottom, left, and right walls corresponding to a location of the reed switch 32.

A dosimeter 23-2 is provided with a mechanical contact type switch 36 embedded at a tip thereof for turning on and off a power supply 35 as shown in FIG. 3(b). The dosimeter 23-2 has a through-hole formed along an extension line of a moving contact of the switch 36. In this case, the block 27 may be provided with a small projecting bar 37 for passing through the through-hole and pushing the movable contact to turn off the switch 36.

A process of manufacturing the rack 21 for housing dosimeters using the blocks 27 with the structure described above will be described next. The rack 21 is a wall mount type and can accommodate fifty dosimeters 23. Fifty blocks 27 are prepared corresponding to the number of the dosimeters to be housed. Then, the blocks 27 are assembled by arranging ten in the vertical direction and five in the horizontal direction to suit an installation location. The projection 27e of the block 27 is fitted to the concavity 27g in the vertical direction, and the projection 27i of the block 27 is fitted to the concavity 27k in the horizontal direction. The blocks 27 are assembled to form an assembled body having an overall shape of a rectangular solid. The rectangular assembled body is covered and fastened with the frame cover 29 on the top, bottom, left, and right surfaces of the body to complete the rack 21.

After the assembly, the rack 21 is mounted and fixed on a wall at a desired location in a workshop. A worker inserts the dosimeter 23 into the housing space 27c in the rack 21 through the entry 27a. Upon the insertion, the reed switch 32 or the switch 36 of the dosimeter 23 is turned off by the magnet 33 or the projecting bar 37, as described previously.

As described above, in the embodiment, the rack 21 is formed of the blocks 27 having the rectangular shape and the housing spaces 27c for housing the dosimeters 23 inserted through the entries 27a. The blocks 27 are combined through fitting the projections to the concavities formed on the top, bottom, left, and right surfaces of the blocks. The blocks 27 are combined in the vertical and horizontal directions through fitting the projections to the concavities of the blocks 27. When an adhesive is used for bonding the blocks in the fitting process, the rack 21 can be integrated without the frame cover 29.

The rack 21 is constructed only by combining a desired number of the blocks 21 for housing the dosimeters 23 vertically or horizontally. Accordingly, it is easy to assemble the rack corresponding to the number of the dosimeters 23 required for service. The rack 21 having desired vertically or horizontally oblong shape can be easily manufactured corresponding to an installation location of the rock. Further, it is possible to manufacture the blocks 27 at low cost, thereby manufacturing the rack 21 at low cost according to the number of the dosimeters 23 and an installation location.

When the dosimeter 23 has the reed switch for turning on and off the power supply thereof by sensing magnetic flux, the block 27 is provided with the magnet in the wall thereof for turning off the reed switch 32 by magnetic flux. When the dosimeter 23 has the switch 36 for mechanically turning on and off the power supply of the dosimeter, the block 27 is provided with the projecting bar 36 in the wall of the block 27 for mechanically turning off the switch 36. Accordingly, when the block 27 receives the dosimeter 23 in the housing space 27c, it is possible to automatically switch off the power supply of the dosimeter 23.

The frame cover 29 covers the outer peripheral surfaces of the rectangular combined body of the blocks 27. The frame cover covers the rectangular combined body after the blocks 27 are combined, so that the blocks are fastened integrally, thereby avoiding collapse. When the frame cover 29 is made of a hard material including a resin or metal, the combined blocks 27 are protected from impact damage.

Figure 4A:
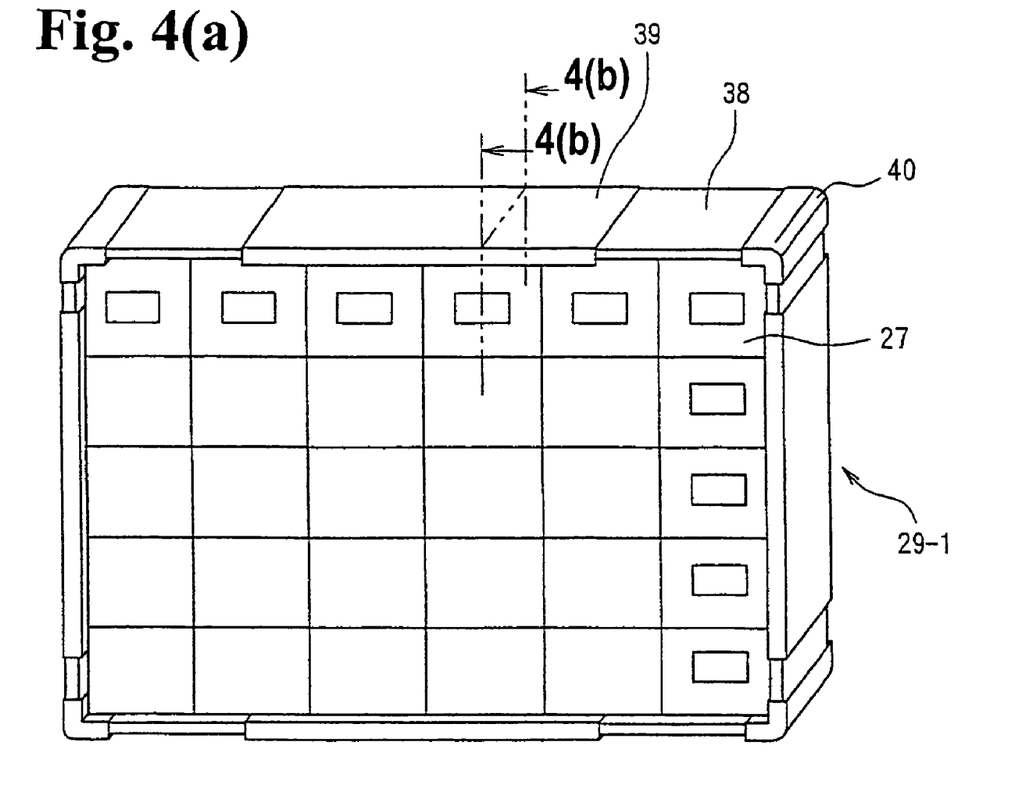
FIG. 4(a) shows a whole structure of the rack.
Figure 4B:
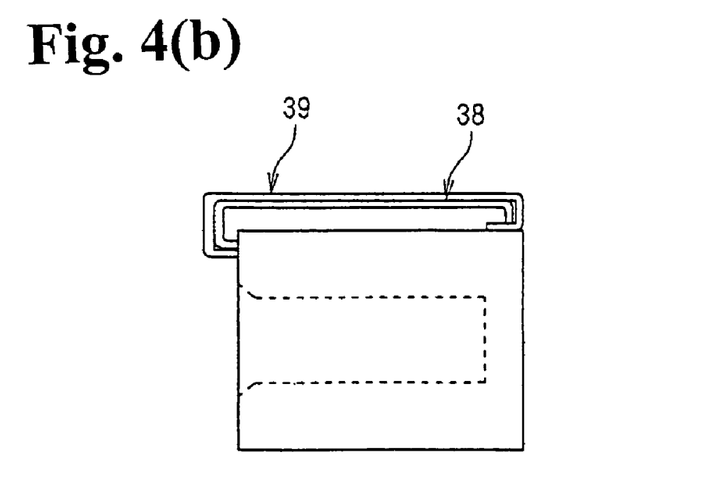
FIG. 4(b) is a sectional view taken along line 4(b)-4(b) in FIG. 4(a)

FIGS. 4(a) and 4(b) are views showing a frame cover having a different structure. A frame cover 29-1 shown in FIGS. 4(a) and 4(b) freely changes a size thereof by sliding vertically or horizontally. In the frame cover 29-1, two slide plates 38 and a guide plate 39 having a U-shaped cross-section are combined such that opposing portions of the slide plates 38 are inserted in the guide plate 39 to freely slide therein in a longitudinal direction. The frame cover 29-1 is formed of a square frame shape having four sets of combined members formed of the slide plates 38 and the guide-plates 39. Joining members 40 having an L-shape are attached to four corners of the square frame. After the square frame is adjusted to a desired size, the slide plates 38 and the guide plates 39 are fixed not to slide using fixing means (not shown).

With the frame cover 29-1 described above, after a required number of the blocks 27 are combined to form the rectangular combined body and the frame cover 29-1 is attached to the peripheral side surfaces of the rectangular combined body, the slide plates 38 and the guide plates are fixed to fasten the blocks 27 integrally. Accordingly, it is possible to use a single frame cover for fastening combined bodies of the blocks having different various sizes.

Figure 5:
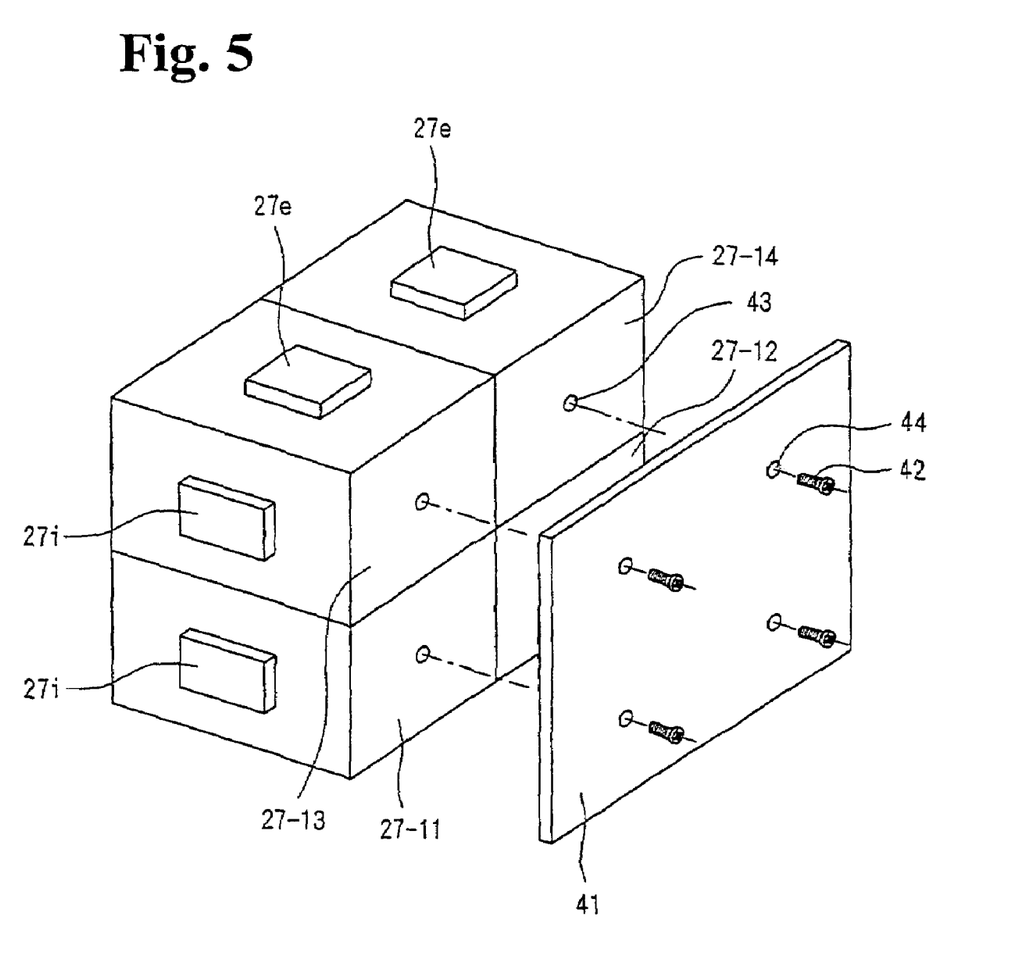
FIG. 5 is a view showing a joining plate for fastening a combined structure of a plurality of the blocks.

With reference to FIG. 5, a joining plate 41 for integrally fastening the combined structure of the blocks 27 will be explained next. When four blocks 27-11 through 27-14 are combined as shown in FIG. 5, instead of the frame cover 29, the joining plate 41 may be attached to rear surfaces of the blocks to be fastened by screws 42. In this case, each of the blocks 27-11 through 27-14 is provided with a hole 43 at the center of the rear surface thereof, and the joining plate 41 has through holes 44 at positions corresponding to the holes 43 in the rear surfaces of the blocks. Pins can be used instead of the screws 42, wherein the holes 43 and 44 are replaced by pinning holes. It is also-possible to combine the blocks 27-11 through 27-14 with a belt of a flexible elastic material such as rubber wound around the peripheral surfaces thereof. When the blocks 27-11 through 27-14 are combined as described above, it is easy to manufacture the rack at low cost in a case that only a small number of the blocks are needed or the rack is needed only temporarily.

Figure 6:
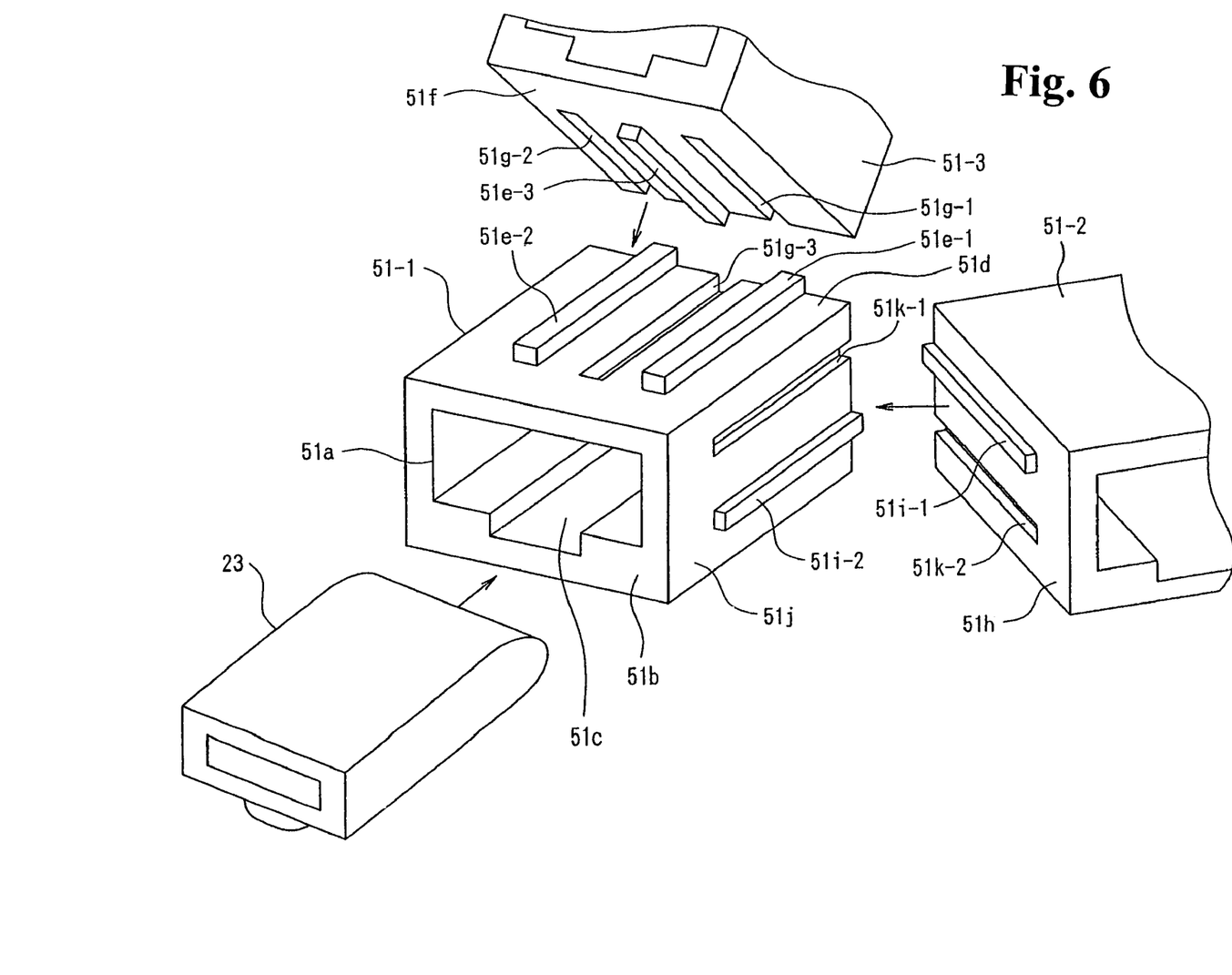
FIG. 6 is a view showing a structure of blocks constituting a rack for housing the dosimeters according to another embodiment of the invention.

FIG. 6 is view showing a structure of a block used in a rack for housing the dosimeters according to another embodiment of the present invention. Features of blocks 51-1 through 51-3 shown in FIG. 6 different from those of the blocks 27-1 through 27-3 shown in FIG. 2 will be described below. Each of the blocks 51-1 through 51-3 is also referred to as a block 51. The block 51 is provided with an entry 51a in a front surface 51b for inserting the dosimeter 23 and a hollow housing space 51c for housing the dosimeter 23 therein. On a top surface 51d, two projections 51e-1 and 51e-2 having a square bar shape are formed in parallel with each other from a position near a front surface to an edge of a rear surface. Between the projections 51e-1 and 51e-2, a concavity 51g-3 is formed as a groove having a dimension same as that of the projections 51e-1 and 51e-2.

On the bottom surface 51f of the block 51, two concavities 51g-1 and 51g-2 having a shape same as that of the concavity 51g-3 are formed in parallel with each other from a position near the front surface to the edge of the rear surface. Between the concavities 51g-1 and 51g-2, a projection 51e-3 having a shape same as that of the projections 51e-1 and 51e-2 is formed. On a left side surface 51h of the block 51, a projection 51i-1 having a shape same as that the projection 51e-1 and a concavity 51k-2 having a shape same as that of the concavity 51g-3 are formed in parallel with each other from a position near the front surface to the edge of the rear surface.

On a right side surface 51j of the block 51, a concavity 51k-1 having a shape same as that of the concavity 51k-2 and a projection 51i-2 having a shape same as that of the projection 51i-1 are formed in parallel with each other from a position near the front surface to the edge of the rear surface. The projections 51e-1 and 51e-2 on the top surface 51d of the block 51-1 arranged at a lower position fit to the concavities 51g-1 and 51g-2 on the bottom surface 51f of the block 51-3 arranged at a higher position. The projection 51e-3 on the bottom surface 51f of the block 51-3 arranged at a higher position fits to the concavity 51g-3 on the top surface 51d of the block 51-1 arranged at a lower position The projection 51i-2 on the right side surface 51j of the block 51-1 fits to the concavity 51k-2 on the left side surface 51h of the block 51-2 arranged at a right side of the block 51-1. The projection 51i-1 on the left side surface 51h of the block 51-2 arranged at a right side fits to the concavity 51k-1 on the right side surface 51j of the block 51-1 arranged at a left side. The projections 51e-1 through 51e-3, 51i-1, and 51i-2, and the concavities 51g-1 through 51g-3, 51k-1, and 51k-2 are formed on the block 51. The block 51 may have any number of projections and concavities as far as each surface has at least one pair of a projection and a concavity formed in parallel with each other, so that the blocks 51 can be fitted vertically and horizontally to be combined integrally. The projections 51e-1 through 51e-3, 51i-1, and 51i-2, and the concavities 51g-1 through 51g-3, 51k-1, and 51k-2 may extend from the edge of the front surface, not from the position near the front surface, to the edge of the rear surface formed in parallel with each other.

Figure 7:
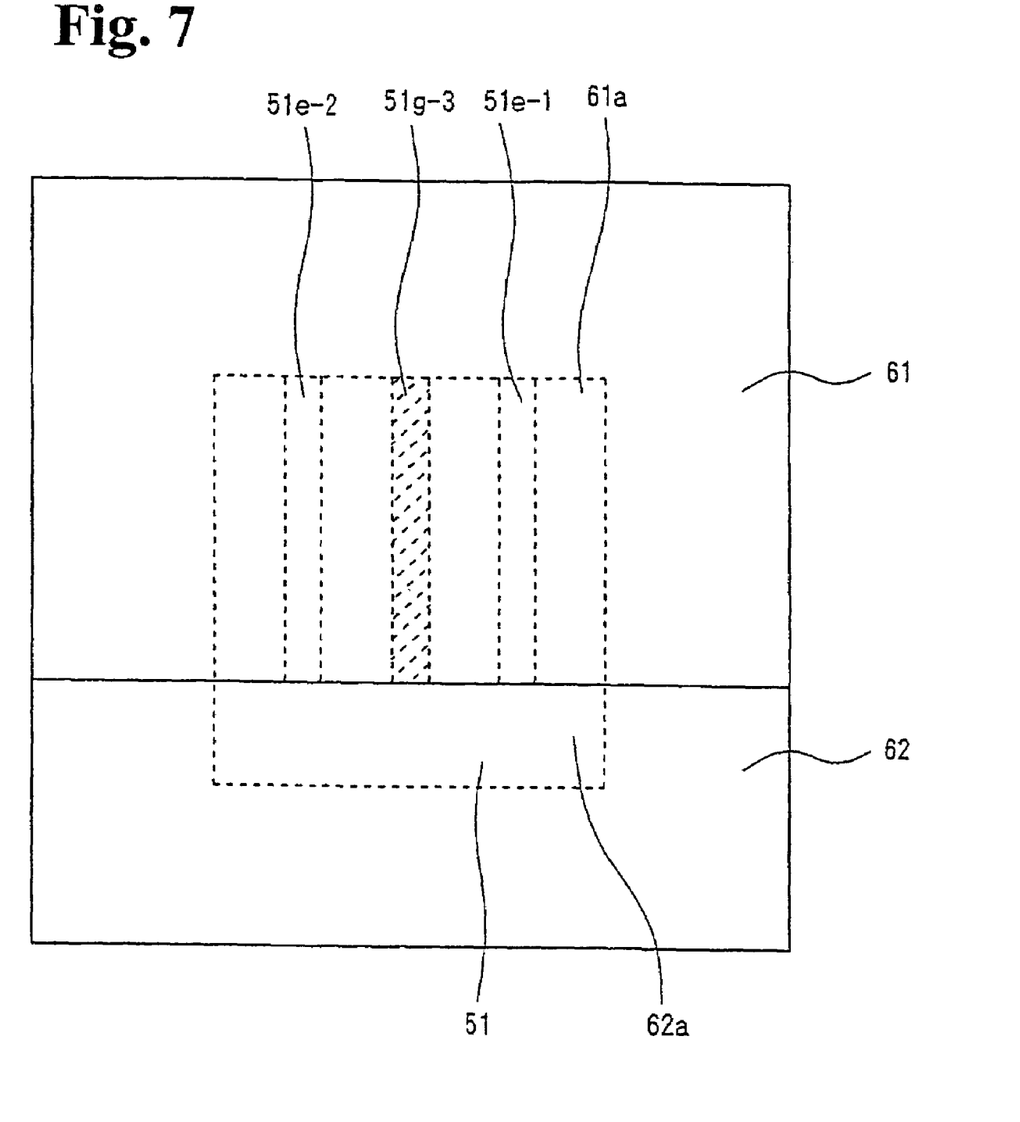
FIG. 7 is a view showing a die for manufacturing the block shown in FIG. 6.

When a pair of dies 61 and 62 shown in FIG. 7 is used, the projections 51e-1 through 51e-3, 51i-1, and 51i-2 and the concavities 51g-1 through 51g-3, 51k-1, and 51k-2 can be molded integrally with a main body of the block 51. The die 61 is provided with a cavity 61a for integrally forming the projections 51e-1 through 51e-3, 51i-1, and 51i-2, and concavities 51g-1 through 51g-3, 51k-1, and 51k-2. The die 62 is provided with a cavity 62a for forming portions of the block 51 other than the portions that are formed using the die 61.

When the block 51 is molded using the dies 61 and 62, a resin selected from the resins mentioned previously is injected through a through hole (not shown) into the cavities 61a and 62a of the dies 61 and 62. Then, after completion of the molding, the dies 61 and 62 are pulled in backward and forward directions to take out the block 51. The block 51 can be molded with the only two dies 61 and 62, thereby reducing cost for manufacturing dies as compared with the block 27 shown in FIG. 2. It is possible to disassemble the dies 61 and 62 by pulling in two directions, thereby reducing manufacturing steps and manufacturing cost of the block 51 as compared with the block 27. When the block 27 is molded, it is necessary to use top, lower, left, right, front and rear dies, and to pull the dies in six directions to disassemble.

Figure 8:
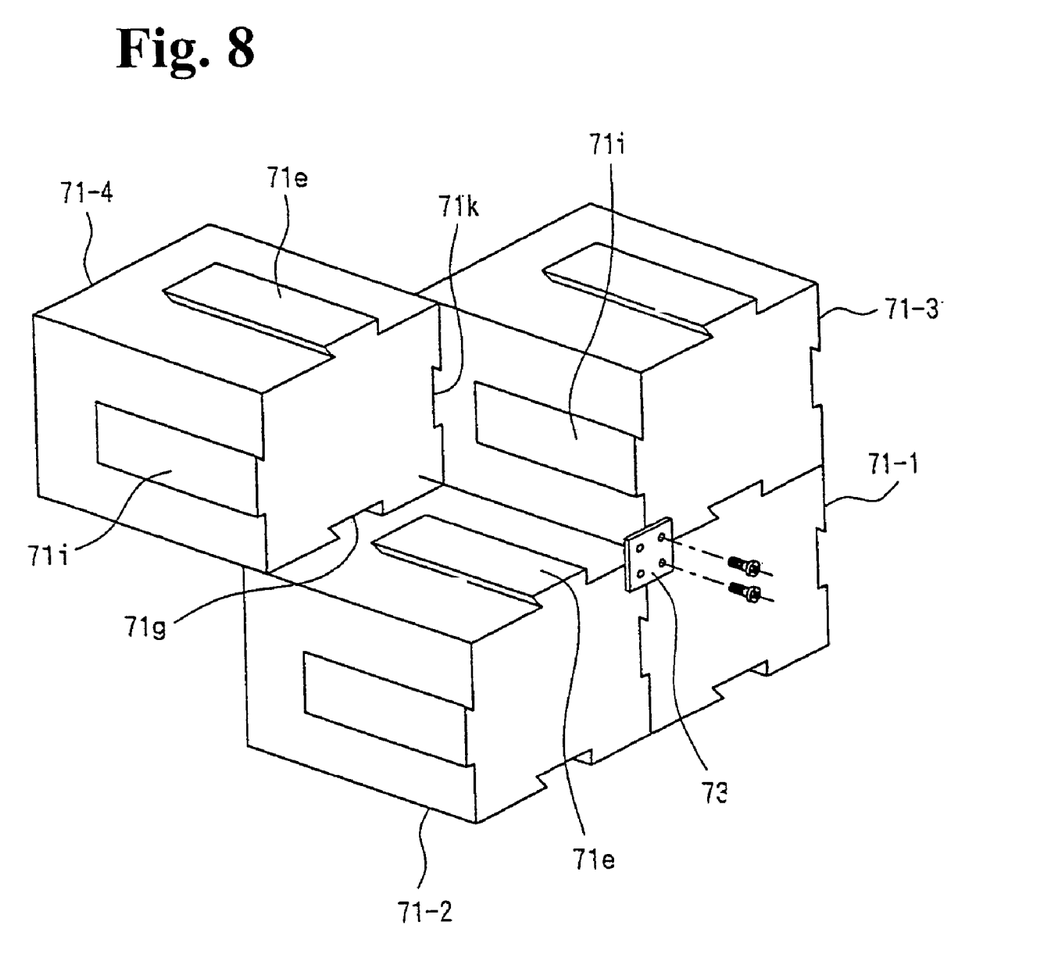
FIG. 8 is a view showing a structure of blocks constituting a rack for housing the dosimeters according to a further embodiment of the invention.

FIG. 8 is a view-showing a structure of blocks constituting a rack for housing the dosimeters according to a further embodiment of the invention. Features of blocks 71-1 through 71-4 shown in FIG. 8 different from the blocks 27-1 through 27-3 shown in FIG. 2 will be described. Each of the blocks 71-1 through 71-4 is also referred to as a block 71. The blocks 71-1 through 71-4 shown in FIG. 8, unlike those shown in FIG. 2, are seen from the rear side. Accordingly, entries and housing spaces for the dosimeters of the blocks 71 are not visible in FIG. 8.

On the top surfaces and left side surfaces of the blocks 71-1 through 71-4 shown in FIG. 8, long and narrow projections 71e and 71i having a trapezoidal cross-section are formed. On the bottom surfaces and right side surfaces, concavities 71g and 71k having the same cross-sections as the projections 71e and 71i are formed and engage the projections 71e and 71i. All the projections 71e and 71i and the concavities 71g and 71k are formed in parallel with each other from a position near the front surface to the edge of the rear surface.

The projections and concavities on the surfaces of the blocks 71-1 through 71-4 are not limited to the projections 71e and 71i and concavities 71g and 71k shown in FIG. 8. Each surface of the block may have any number of projections and concavities as far as the projections and the concavities are formed in parallel with each other so that the blocks 71 are engaged vertically and horizontally to combine integrally. The projections 71e and 71i and concavities 71g and 71k may extend from the edge of the front surface, not from the position near the front surface, to the edge of the rear surface formed in parallel with each other.

In the blocks 71 of the embodiment, the projection 71e of the block 71-2 and the projection 71i of the block 71-3 are inserted into the concavity 71g and the concavity 71k of the adjacent block 71-4 to engage the same, respectively. By engaging the blocks 71 in this way, the blocks 71 are combined more firmly as compared with the blocks 27 shown in FIG. 2 and the blocks 51 shown in FIG. 6.

While the blocks 71 are firmly combined, the blocks 71 can be joined further tightly by using a small square fitting 73 and screws as shown in FIG. 8. The fitting 73 may have a minimum size necessary for fastening the blocks 71-1 through 71-4 with screws at a central region of a structure consisting of the four combined blocks. A size of the fitting is minimized to reduce material cost. The fitting 73 can be used to fasten only two or three blocks. Two or more fittings 73 can fasten a whole structure consisting of four or more blocks. The blocks 71 can also be manufactured using a pair of dies like the dies shown in FIG. 7, thereby making cost of the dies lower than that of the blocks 27 shown in FIG. 2 and further reducing manufacturing cost of the blocks 71.

Figure 9:
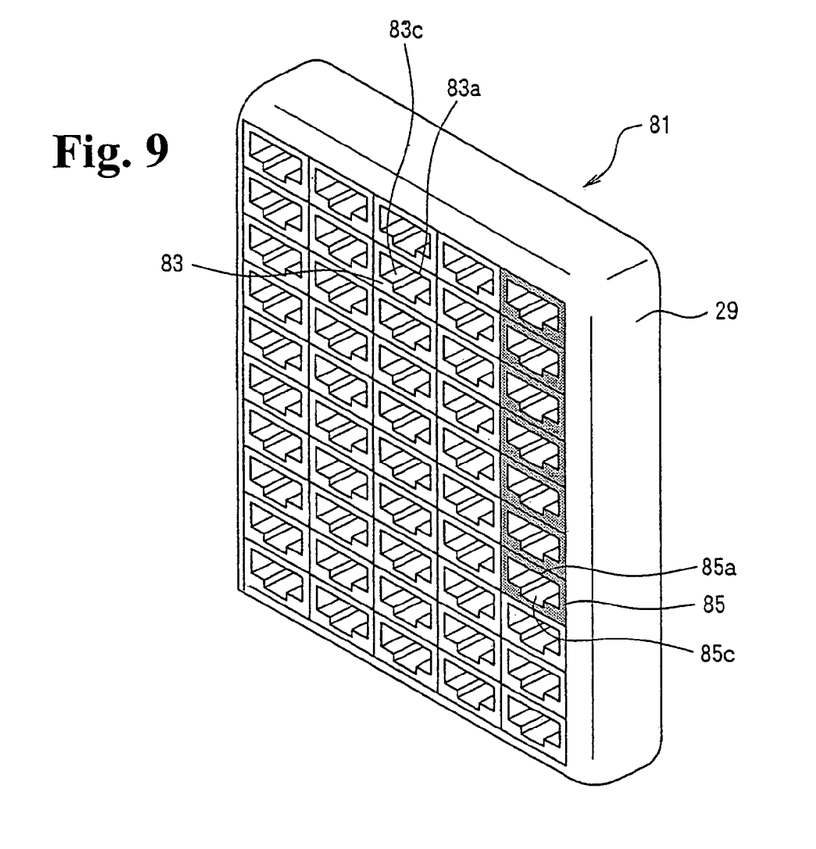
FIG. 9 is a view showing a structure of blocks constituting a rack for housing the dosimeters according to a still further embodiment of the invention.

FIG. 9 is a view showing a structure of blocks constituting a rack for housing the dosimeters according to a still further embodiment of the invention. As shown in FIG. 9, different from the rack 21 shown in FIG. 1, a rack 81 is constructed by combining two types of blocks, i.e. blocks 83 and blocks 85, having housing spaces 83c and 85c with different sizes (hereinafter called as housing size) and the same external dimension. That is, the housing space 83c of the block 83 has a size different from that of the housing space 85c of the block 85. The rack 81 is employed for housing two types of dosimeters having different sizes. Entries 83a and entries 85a may have a same size or different sizes.

Since the block 83 and the block 85 have the same external dimension in spite of the different housing sizes, the blocks can be combined without considering the different housing sizes. Therefore, the rack 81 can be suited to the number of the dosimeters for service and an installation location, and can be manufactured at low cost. In the embodiment, the blocks have the two housing sizes, and the blocks may have three or more different housing sizes as far as the blocks have the same external size. In this case, the blocks can be combined without considering the different housing sizes, and the rack suited to the number of the dosimeters and an installation location can be manufactured at low cost.

A visible portion of the block such as the front surface may be painted, or the block may be molded with a colored resin according to the housing size, thereby making it easy to identify the difference when the dosimeters are housed.

The disclosure of Japanese Patent Application No. 2004-051880 filed on Feb. 26, 2004 is incorporated in the application.

While the invention has been explained with reference to the specific embodiments, the explanation is illustrative and the invention is limited only by the appended claims.

What is claimed is:

1. A rack for housing dosimeters, comprising:
a plurality of blocks assembled together in at least one of vertical and horizontal directions, each of said blocks having a rectangular external shape with a front, rear, top, bottom, left and right surfaces, an entrance opened in the front surface for inserting one dosimeter, a housing space for housing the one dosimeter, and at least one of a projection and a concavity formed on at least one of the top, bottom, left, and right surfaces so that one of the projection and the concavity in one block engages one of the concavity and the projection formed at an adjacent block, and
switching means formed in each of the housing spaces, said switching means turning off a power supply of one dosimeter when the one dosimeter is inserted into the housing space.

2. A rack for housing dosimeters according to claim 1, wherein said switch means is a magnet embedded in a wall thereof for switching a power supply of the one dosimeter with magnetic flux generated by the magnet.

3. A rack for housing dosimeters according to claim 1, wherein said switching means in the housing space mechanically turns on and off the power supply of the one dosimeter.

4. A rack for housing dosimeters according to claim 1, wherein each block includes at least one pair of the projection and the concavity, said projection having a bar shape and said concavity having a shape fitting to the projection with the bar shape, said pair of the projection and concavity being formed on one outer surface of the block parallel to each other in a direction connecting the front surface and the rear surface.

5. A rack for housing dosimeters according to claim 1, wherein said plurality of blocks includes a plurality of different kinds of blocks having same external dimensions and different housing spaces.

6. A rack for housing dosimeters according to claim 5, wherein each of said different kinds of blocks has a same color different from the others.

7. A rack for housing dosimeters according to claim 1, further comprising a cover member covering at least one of outer surfaces of the blocks.

8. A rack for housing dosimeters according to claim 7, wherein said cover member includes a guide plate, two slide plates slidably fitted to the guide plate, and a fixing member for fixing the guide plate and the slide plates.

9. A rack for housing dosimeters according to claim 8, further comprising connection members, each connection member connecting the cover members arranged in a frame shape.

10. A rack for housing dosimeters according to claim 1, further comprising a joining plate attached to the rear surfaces of the blocks for fixing the blocks with screws or pins.

11. A block for housing a dosimeter, comprising:
- a front, rear, top, bottom, left and right surfaces to from a rectangular solid shape with a housing space for housing the dosimeter,
- an entrance opened in the front surface for inserting the dosimeter,
- at least one of a projection and a concavity formed on at least one of the top, bottom, left, and right surfaces, said projection having a shape engaging the concavity, and
- switching means formed at one of the front, rear, top, bottom, left and right surfaces, said switching means turning off a power supply of one dosimeter when the one dosimeter is inserted into the housing space.

12. A block according to claim 11, wherein said switching means is a magnet switch for switching a power switch of the dosimeter through magnetic flux generated by the magnet.

13. A block according to claim 11, wherein said switching means mechanically turns on and off the power switch of the dosimeter.

14. A block according to claim 11, wherein said projection and concavity are formed on one outer surface of the block parallel to each other in a direction connecting the front surface and the rear surface, said projection having a bar shape and said concavity having a shape fitting to the projection with the bar shape.

15. A rack for housing dosimeters according to claim 1, wherein said switching means turns on the power supply when the one dosimeter is taken out from the housing space.

16. A block according to claim 11, wherein said switching means turns on the power supply when the one dosimeter is taken out from the housing space.

* * * * *